2,890,514
CERAMIC PRODUCTS

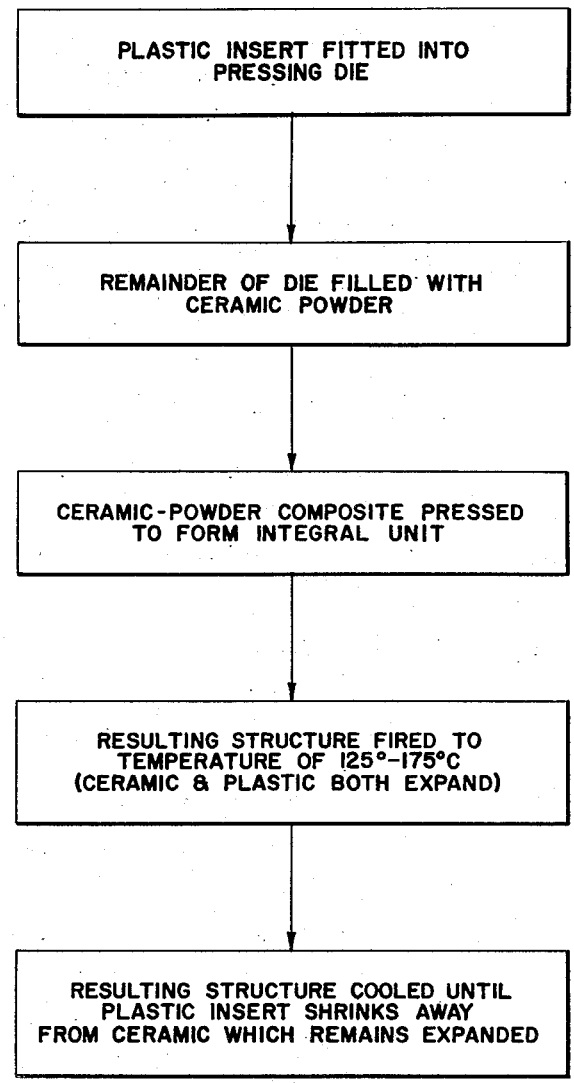

Robert F. Doran, Huntington, and Theodore S. Stanislaw, Centerport, N.Y., assignors, by mesne assignments, to Sylvania Electric Products Inc., Wilmington, Del., a corporation of Delaware Application June 4, 1956, Serial No. 588,955

3 Claims. (Cl. 25—156)

Our invention is directed toward a process for internally shaping ceramic bodies.

Conventionally, in order to form a ceramic body with a predetermined internal shape or contour, a properly prepared ceramic powder is first placed into a die and punch assembly and then is pressure formed to the desired shape. The body thus produced has an internal contour which is complementary in shape to the punch actually utilized. While this method is economical and fast, it has certain limitations. For example, it is either impracticable or not possible to form contours having sharp angles or square corners by this method. We have invented a new process which avoids these difficulties.

Accordingly, it is an object of the present invention to provide a new and improved process of the character indicated.

Another object is to improve processes for forming ceramic bodies with predetermined internal contours in such manner that the contour can have sharp angles or square corners.

Still another object is to provide a new and improved process of the character indicated, in which a plastic insert is utilized to form the desired internal contour and the plastic insert is subsequently removed from the ceramic body.

These and other objects of our invention will either be explained or will become apparent hereinafter.

In our invention, a plastic insert of appropriate geometry is fitted into an appropriate pressing die; in a sense the insert becomes the male part of the die assembly. The remaining part of the die cavity is then filled with ceramic powder and pressure is applied to the ceramic-plastic composite. In this manner, the powder and insert are formed into an essentially integral unit. The structure is then heated to a first temperature at which both the ceramic and the plastic insert expand slightly. The heated structure is then cooled to a second and lower temperature at which the ceramic remains expanded and the plastic insert contracts, whereby the insert shrinks from the body and can be removed therefrom.

Illustrative embodiments of our invention will now be described in detail with reference both to the accompanying flow sheet and to the specific examples which follow.

Example I

A truncated plastic cone formed from brown Bakelite was placed in a suitable die so that the base of the cone was flush with the top of the die. A ceramic powder of high alumina content was poured into the die and the plastic-ceramic composite was die pressed at room temperature to form an essentially integral structure. The structure was then heated to a temperature of 150° C. At this point it was found that the plastic had expanded by about 0.3% and the ceramic had expanded approximately 0.2%. The structure was then cooled to room temperature and it was found that the ceramic remained permanently expanded. However, the plastic insert contracted; indeed the dimensions of the cooled insert were found to be reduced as compared to the dimensions of the insert before heating. As a result, all surfaces of the plastic insert shrank from the ceramic allowing the insert to be removed therefrom. The above process is shown in diagrammatical form on the accompanying flow sheet.

The ceramic was then fired in the usual manner to maturity. The internal contour of the ceramic conformed to the original conformation of the plastic insert.

Since during heating the plastic expanded to a somewhat larger extent than the ceramic, in order to prevent rupture of the ceramic it was found that the rate of heating had to be controlled. An acceptable heating rate was found to fall within the range of 1°–3° C. per minute.

Example II

The process outlined in Example I was repeated using various firing temperatures falling within the range 125°–175° C. Substantially the same results were obtained.

Example III

The process outlined in Example I was repeated using a plastic insert formed from nylon. Substantially the same results were obtained.

While we have shown and pointed out our invention as applied above, it will be apparent to those skilled in the art that many modifications can be made within the scope and sphere of our invention as defined in the claims which follow.

What is claimed is:

1. A method for removing a plastic insert of the Bakelite type from a substantially integral structure formed from a ceramic body in which said insert is at least partially embedded, said method comprising the steps of heating said structure to a temperature falling within the range 125°–175° C. until said body permanently and slightly expands and said insert temporarily and slightly expands; and cooling said structure to a maximum temperature on the order of 100° C. until said insert contracts slightly and shrinks from said body; and removing said insert from said body.

2. A method for forming a ceramic body having an internal cavity of predetermined contour communicating with the outer surface of said body, said method comprising the steps of inserting a plastic member of the Bakelite type and having a shape complementary to said cavity into a die; filling the space between said member and the inner walls of said die with ceramic powder, whereby a ceramic-plastic composite is formed; subjecting said composite to a pressure at which the powder and member are formed into a substantially integral structure; heating said structure to a first temperature falling within the range 125°–175° C. at which said ceramic and said plastic both expand slightly; and cooling said structure to a second and lower temperature having a maximum value of about 100° C. at which said ceramic remains expanded while said plastic member contracts; and removing said member from the ceramic whereby said body is produced.

3. The method as set forth in claim 1, wherein said structure is slowly heated at a rate falling within the range 1°–3° C. per minute.

References Cited in the file of this patent

UNITED STATES PATENTS

| 197,468 | Hiler | Nov. 27, 1877 |
| 1,808,047 | Littleton et al. | June 2, 1931 |

FOREIGN PATENTS

| 493,045 | Canada | May 19, 1953 |